US011581756B2

(12) United States Patent
Mynar et al.

(10) Patent No.: US 11,581,756 B2
(45) Date of Patent: Feb. 14, 2023

(54) FOREIGN OBJECT DETECTION METHOD AND APPARATUS

(71) Applicant: NXP USA, Inc., Austin, TX (US)

(72) Inventors: Zbynek Mynar, Roznov pod Radhostem (CZ); Vojtech Musil, Kuncice pod Ondrejnikem (CZ); Josef Tkadlec, Horni Lidec (CZ)

(73) Assignee: NXP USA, Inc., Austin, TX (US)

(*) Notice: Subject to any disclaimer, the term of this patent is extended or adjusted under 35 U.S.C. 154(b) by 108 days.

(21) Appl. No.: 16/985,403

(22) Filed: Aug. 5, 2020

(65) Prior Publication Data

US 2021/0083524 A1 Mar. 18, 2021

(30) Foreign Application Priority Data

Sep. 16, 2019 (EP) ..................................... 19197609

(51) Int. Cl.
*H02J 50/60* (2016.01)
*H02J 50/12* (2016.01)
*H02J 50/80* (2016.01)

(52) U.S. Cl.
CPC .............. *H02J 50/60* (2016.02); *H02J 50/12* (2016.02); *H02J 50/80* (2016.02)

(58) Field of Classification Search
None
See application file for complete search history.

(56) References Cited

U.S. PATENT DOCUMENTS

| 9,623,763 | B2 | 4/2017 | Wechlin et al. | |
| 2013/0076153 | A1 | 3/2013 | Murayama et al. | |
| 2013/0134792 | A1* | 5/2013 | Bunsen ................... | H02J 50/60 307/104 |
| 2017/0117755 | A1 | 4/2017 | Muratov et al. | |
| 2017/0222489 | A1 | 8/2017 | Nakano et al. | |
| 2018/0198324 | A1 | 7/2018 | Bunsen et al. | |
| 2020/0119595 | A1* | 4/2020 | Nakano ................... | H02J 50/80 |
| 2020/0259369 | A1* | 8/2020 | Stingu ..................... | H02J 50/50 |

FOREIGN PATENT DOCUMENTS

EP 3506460 A1 7/2019

* cited by examiner

*Primary Examiner* — Daniel Kessie
*Assistant Examiner* — Terrence R Willoughby (57) ABSTRACT

A system and method to detect the presence of conductive foreign objects for a multi-coil wireless power system is described. A wireless power receiver resonant circuit quality information may be obtained without any costly hardware or termination of power delivery to the power receiver load. The power receiver free-running coil current or voltage may be measured during a very short time window. In this time window, the measurement may be unaffected by transmitter and receiver load due to the transmitter coil disconnection and because the wireless power receiver has sufficient DC-bus capacitance.

19 Claims, 8 Drawing Sheets

FOREIGN OBJECT DETECTION METHOD AND APPARATUS

CROSS-REFERENCE TO RELATED APPLICATIONS

This application claims the priority under 35 U.S.C. § 119 of European Patent application no. 19197609.1, filed on 16 Sep. 2019, the contents of which are incorporated by reference herein.

FIELD

This disclosure relates to a method and apparatus for foreign object detection using a wireless power receiver in a wireless power system.

BACKGROUND

Wireless power systems transfer power between a wireless power transmitter and a wireless power receiver which is connected to further circuitry. This wireless power transmitter may detect a foreign object (FO) in the path between the wireless power transmitter and wireless power receiver. The presence of a foreign object may disrupt the power transfer and the foreign object may itself heat up resulting in a potential hazard. When such a foreign object is detected, the wireless power transmitter may be shut down.

SUMMARY

Various aspects of the disclosure are defined in the accompanying claims.

In a first aspect there is provided a power receiver unit (PRU) controller for inclusion in a wireless power receiver, the PRU controller is configured to: generate a measurement request for transmitting to the wireless power transmitter; generate an enable signal configured to enable a modulator in the wireless power receiver during a predetermined time window; receive a measurement signal corresponding to a resonant circuit signal in a resonant circuit of the wireless power receiver; process the measurement signal and determine whether a foreign object is present between the wireless power receiver and the wireless power transmitter from the processed measurement signal; and wherein the wireless power receiver does not receive any power from the wireless power transmitter during at least part of the predetermined time window.

In one or more embodiments, the PRU controller may further comprise a first input configured to be coupled to a first resonant circuit node; a second input configured to be coupled to a second resonant circuit node; a third input configured to be coupled to a first wireless receiver output; a fourth input configured to be coupled to a second wireless receiver output; and a modulator control output configured to be coupled to the modulator; wherein the resonant circuit signal comprises one of the voltage or current between a first resonant circuit terminal; and a second resonant circuit terminal.

In one or more embodiments, the PRU controller may be further configured to process the measurement signal to determine a quality factor or a parameter related to the quality factor of the resonant circuit from the measurement signal.

In one or more embodiments, the PRU controller may be further configured to determine a quality factor or a parameter related to the quality factor of the resonant circuit from the rate of amplitude decrease of the measurement signal.

In one or more embodiments, the PRU controller may further comprise an analog to digital converter coupled to a control module.

In one or more embodiments, the PRU controller may be further configured to generate a foreign object detect status for transmission to the wireless power transmitter.

In one or more embodiments, the PRU controller may be incorporated into a wireless power receiver further comprising a modulator coupled to a resonant circuit, a rectifier having an input coupled to the resonant circuit and an output configured to be coupled to a load wherein the PRU controller is coupled to the modulator and the resonant circuit and wherein the wireless power receiver is configured to: transmit a measurement request to the wireless power transmitter; couple the modulator to the resonant circuit during a predetermined time window in which the wireless power receiver does not receive any power from the wireless power transmitter; process a measurement signal corresponding to the resonant circuit signal during the predetermined time window: determine whether a foreign object is present between the wireless power receiver and the wireless power transmitter from the processed measurement signal.

In one or more embodiments, the wireless power receiver may further comprise a measurement circuit having an input coupled to the resonant circuit and an output coupled to the PRU controller.

In one or more embodiments, the measurement circuit may further comprise a series arrangement of a filter and a rectifier between the measurement circuit input and the measurement circuit output and wherein the PRU controller is further configured to detect the measurement signal by sampling the filtered and rectified resonant circuit modulation signal.

In a second aspect there is provided a power transmitter unit (PTU) controller for inclusion in a wireless power transmitter configured to transmit power to a wireless power receiver, the wireless power transmitter further comprising an inverter coupled to a resonant circuit, wherein the PTU controller comprises: a pulse-width modulation output configured to be coupled to the inverter, a control output configured to be coupled to the resonant circuit; and a current sense input configured to be coupled to the resonant circuit and wherein the PTU controller is configured to: receive a measurement request from the wireless power receiver; disable the power transmission for a predetermined time window in response to receiving a measurement request from the wireless power receiver.

In one or more embodiments, the PTU controller may be further configured to receive a foreign object detect status from the wireless power receiver and to disable the power transmission in response the foreign object detect status indicating that a foreign object has been detected.

The PTU controller may be incorporated into a wireless power transmitter. A wireless power transfer system may include a wireless power receiver and the wireless power transmitter.

In a third aspect there is provided a method for detecting a foreign object by a wireless power receiver, the method comprising generating a measurement request for transmitting to the wireless power transmitter; generating an enable signal configure to enable a modulator in the wireless power receiver for a predetermined time window; receiving a measurement signal corresponding to a resonant circuit signal in a resonant circuit of the wireless power receiver; processing the measurement signal; determining whether a foreign object is present between the wireless power receiver and the wireless power transmitter from the processed measurement signal; wherein the wireless power receiver does not receive any power from the wireless power transmitter during at least part of the predetermined time window.

In one or more embodiments, processing the measurement signal may comprise determining a quality factor or a parameter related to the quality factor of the resonant circuit from the measurement signal.

In a fourth aspect there is described a computer program product for detecting a foreign object by a wireless power receiver configured to receive power from a wireless power transmitter and provide power to a load, the wireless power receiver comprising a modulator coupled to a resonant circuit, a rectifier having an input coupled to the resonant circuit and an output configured to be coupled to the load, the computer program product comprising instructions which, when being executed by a processing unit, cause said processing unit to perform the steps of generating a measurement request for transmitting to the wireless power transmitter; enabling the modulator for a predetermined time window; receiving a measurement signal corresponding to a resonant circuit signal; processing the measurement signal; determining whether a foreign object is present between the wireless power receiver and the wireless power transmitter from the processed measurement signal; wherein the wireless power receiver does not receive any power from the wireless power transmitter during at least part of the predetermined time window.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION

Figure 1:
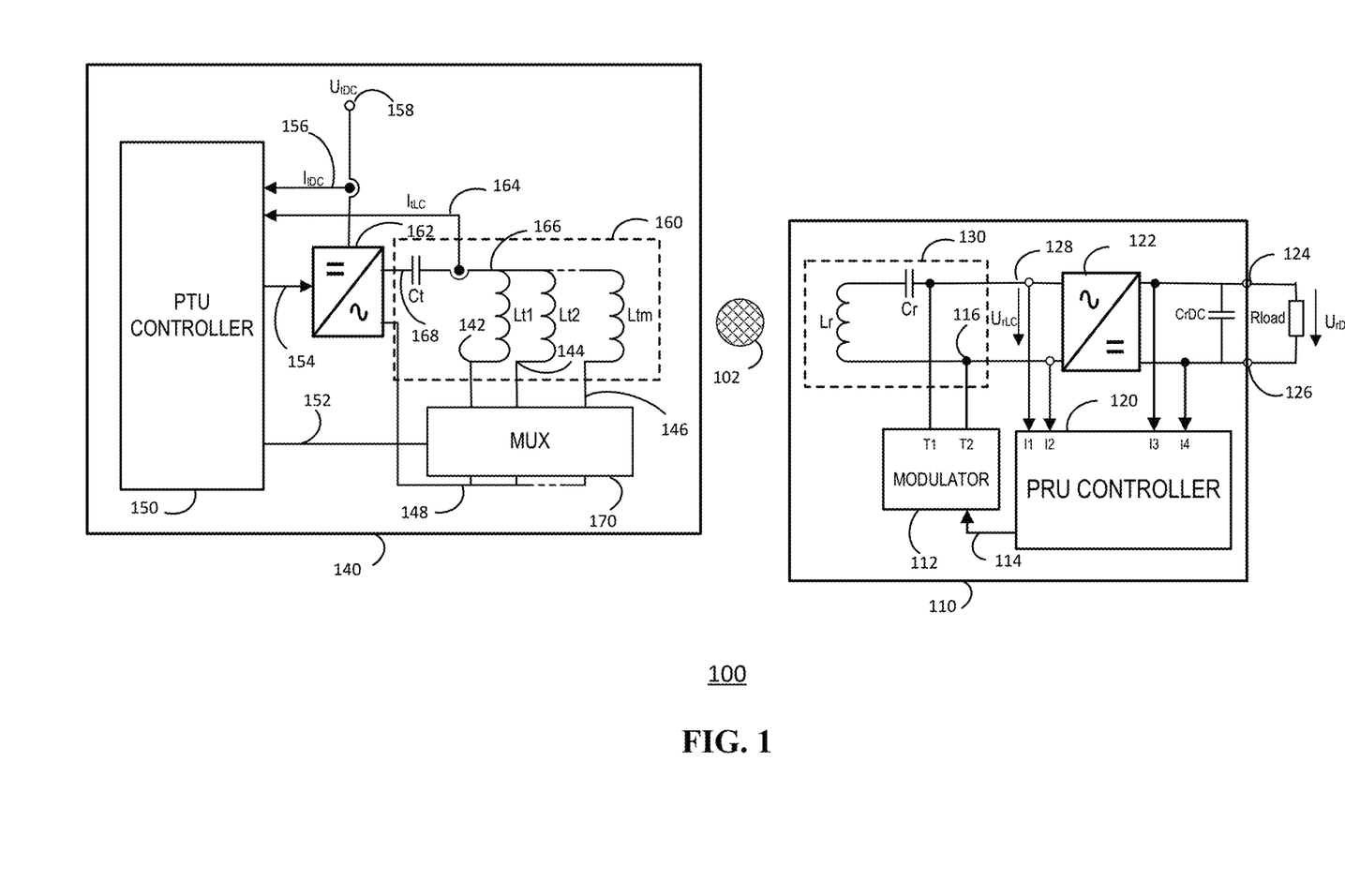
FIG. 1 shows a wireless power system including a wireless power transmitter and a wireless power receiver according to an example embodiment.

FIG. 1 shows a wireless power transfer system 100 including a wireless power transmitter unit (PTU) 140 and wireless power receiver unit (PRU) 110 according to an example embodiment.

The wireless power receiver unit 110 includes a power receiver unit controller 120, a modulator 112, a rectifier 122, a resonant circuit 130 and a smoothing capacitor $C_{rDC}$. The resonant circuit 130 includes a receiver coil array (RCA) which may be formed using a planar coil $L_r$ and a ferrite backplate (not shown). The resonant circuit 130 also has a receiver capacitor $C_r$ arranged in series with the planar coil $L_r$ between a first resonant circuit node 128 and a second resonant circuit node 116. The first resonant circuit node 128 may be connected to a first terminal of the modulator circuit 112, a first input of the power receiver unit controller 120 and a first input of the rectifier 122. The second resonant circuit node 116 may be connected to a second terminal of the modulator circuit 112, a second input of the power receiver unit controller 120 and a second input of the rectifier 122.

The power receiver unit controller 120 may have a control output 114 connected to the modulator 112. A first output node 124 may be connected to a third input of the power receiver unit controller 120 and a first output of the rectifier 122. A second output node 126 may be connected to a fourth input of the power receiver unit controller 120 and a second output of the rectifier 122. The DC smoothing capacitor $C_{rDC}$ may be connected between the first output node 124 and the second output node 126.

The wireless power transmitter unit 140 includes a power transmit unit (PTU) controller 150, an inverter 162, a resonant circuit 160 and a coil multiplexer 170. The resonant circuit 160 includes a transmitter coil array (TCA) which may be formed from a series arrangement of a transmitter capacitor Ct and a parallel arrangement of a number (m) of planar coils denoted $L_{t1}$, $L_{t2}$, $L_{tm}$. A first terminal of each planar coil $L_{t1}$, $L_{t2}$, $L_{tm}$ may be connected to a resonant circuit node 166. Each of the respective second terminals of $L_{t1}$, $L_{t2}$, $L_{tm}$ 142, 144, 146 may be connected to a respective input of the coil multiplexer 170. The TCA may also include a ferrite backplate (not shown). A first terminal of the transmitter capacitor $C_t$ may be connected to the resonant circuit node 166. A second terminal of the transmitter capacitor $C_t$ may be connected to a first inverter output 168. A second inverter output 148 may be connected to the coil multiplexer 170. A supply rail 158 may be connected to the inverter 162.

The PTU controller 150 may have a pulse-width modulation (PWM) output 154 connected to the inverter 162. The PTU controller 150 may have a multiplexer control output 152 connected to a control input of the coil multiplexer 170. The PTU controller 150 may have a first current sense input 156 coupled to the supply rail 158. The PTU controller 150 may have a second current sense input 164 coupled to the resonant circuit node 166.

In operation of the wireless power transfer system 100, the PTU 140 generates and controls a high-frequency magnetic field using the resonant circuit 160 to perform wireless power transmission.

The PTU controller 150 may measure PTU electrical quantities for example input voltage ($U_{tDC}$) supplied by the supply rail 158 to the inverter 162 together with the corresponding input current ($I_{tDC}$) which may be determined from the first current sense input 156. The coil current ($I_{tLC}$) flowing during the resonant circuit 160 communication with PRU 110 may be sensed on the second current sense input 166, which may for example be used to receive in-band data from the PRU 110. The PTU controller 150 may also generate pulse-width modulation (PWM) driving signals on the PWM output 154 for inverter 162, so wireless power transfer can be safely established and maintained.

The inverter 162 may be a fill-bridge or half-bridge power stage used to generate high-frequency voltage signal usually 100-150 kHz at the resonant circuit 160.

The coil multiplexer 170 may selectively connect and disconnect the second terminal respective coils $L_{t1}$, $L_{t2}$, $L_{tm}$ to the second inverter output 148. The TCA coils can be disconnected or connected using coil multiplexer, because only n coils (where $1 \leq n \leq m$) are usually actively participating in power transfer in multi-coil system. The coil multiplexer 170 is controlled by the multiplexer control output 152

The PRU 110 receives and converts the received power for a load on the first output node 124 and the second output node 126. The first output node 124 and the second output node 126 may be referred to as the DC power bus or DC-bus. As illustrated in FIG. 1 this load is represented as a resistance $R_{load}$ connected between the first output node 124 and the second output node 126. However, typically this load may include a DC/DC converter and further circuitry or devices. The power received by the PRU 110 from the PTU 140 is also used to power circuitry that is part of the PRU 110 itself such as the circuitry forming part of the PRU controller 120.

The PRU controller 120 may be an integrated device which senses PRU electrical parameters. The PRU electrical parameters may include for example the DC output voltage $U_{rDC}$ across the first output node 124 and the second output node 126 which may be detected via the third and fourth inputs of the PRU Controller 120. The PRU electrical parameters may include for example resonant circuit voltage $U_{rLC}$ across the first resonant circuit node 128 and the second resonant circuit node 116 which may be detected via the first and second inputs of the PRU Controller 120. The PRU controller 120 may communicate to the PTU 140 via in-band communication by driving the modulator 112 via control output 114. Data transfer may be achieved for example by activating and deactivating modulator 112 resulting in amplitude modulation, which may be detectable by PTU 140 by sensing current $I_{tLC}$. Other example modulators may use different modulation methods. A PRU typically includes a modulation circuit even where in-band communication is not always used for example for high power transfer. For these cases, the modulation circuit 112 may typically be used only for power transfer initiation phase, typically referred to as a digital ping. In other examples if the PRU 110 and PTU 140 include out-band transceivers, the PRU controller 120 may communicate to the PTU 140 via an out-band communication. The modulation circuit 112 may include a resistor-capacitor network which may be coupled to the resonant circuit and switchably coupled to a reference supply to modulate the resonant circuit signal.

The PRU 110 may periodically or otherwise initiate a measurement cycle to start the process to determine whether or not a foreign object 102 is present between a PTU 140 and PRU 110. In some examples the measurement may be initiated by a request from the PTU 140. At the start of the measurement cycle, the PRU controller 120 may control the modulator 112 to transmit a measurement request in-band or out-band to the PTU 140. The PTU controller 150 may detect the measurement request and disable all the TCA coils $L_{t1}$, $L_{t2}$, $L_{tm}$ for a short predetermined measurement time window by controlling the coil multiplexer 170. During this predetermined measurement time window, the PRU controller 120 may enable the modulator 112 which is connected to the receiver resonant circuit 130. The PRU controller 120 may sense the resulting resonant circuit signal by sensing the resonant circuit voltage $U_{rLC}$ and then determining a measurement signal voltage $U_m$ from the resonant circuit voltage $U_{rLC}$.

The inventors of the present disclosure have appreciated that this measurement signal $U_m$ may be used to accurately determine the Q factor of the receiver resonant circuit 130 or a parameter related to the Q-factor. The Q-factor value varies dependent on whether a foreign object is present near to a PRU 110, and so the accurate determination of the Q factor or a related parameter may be used for foreign object detection. Further by using the modulator circuit which is typically available in wireless power receivers to modulate the resonant circuit to provide in-band communication and includes a resistor capacitor network, no further circuitry may be required.

Wireless power transfer systems have traditionally used methods which are based on power-loss model of PTU and PRU. The Foreign Object (FO) presence is then determined from difference between estimated and measured PTU input and PRU output power. These methods rely on a number of measured signals, parameters, non-linear system models and synchronized measurement windows to reach necessary precision. In higher-power wireless systems this can become very difficult. The PRU controller 120 in the PRU receiver 110 may allow foreign object detection (FOD) to be performed on the receiver side even for higher power wireless systems.

The rate of $U_m = f(U_{rLC})$ signal decay i.e. the decrease in signal amplitude during the measurement window may depend on the quality factor of the receiver-side resonant circuit. The receiver quality factor $Q_r$ (or another value which represents the receiver quality factor) may be determined for example by dividing and level shifting the $U_{rLC}$ signal and sampling the resulting voltage signal using an analog to digital converter with constant sampling period. The PRU controller 120 may then determine the rate of signal decay of $U_m$ postprocessed for example using and auto-regressive model and offline least square method. This value may be used to determine whether or not a foreign object is present.

In other examples, the PRU controller 120 may determine zero crossing times of $U_m = f(U_{rLC})$ signal and synchronize measurement of the $U_m$ signal so that only peaks are measured. The ratio of consecutive samples in such a measured envelope signal which represents the rate of decrease of the resonant circuit signal then directly yields the quality factor information $Q_r$.

The inventors of the present disclosure have appreciated that FOD methods as described may be performed by the wireless power receiver. Traditional FOD methods are implemented only on the transmitter side because of the requirement to disable the coils during the measurement cycle. By detecting a foreign object in a short measurement window for example less than 300 microseconds, no power interruption to the load is made since the smoothing capacitance $C_{rDC}$ may store sufficient charge to power the load during the measurement interval and also provide power to the PRU controller 120. FOD using the wireless power receiver may provide an alternative method to FOD using the wireless power transmitter.

Furthermore, blind-spots may exist in foreign object detection methods which are performed only on the transmitter side for example as described in European Patent application 18166402.0 However, by using transmitter side foreign object detection as described in European Patent application 18166402.0 in conjunction with the method of the present disclosure, blind-spots are no longer present.

Figure 2:
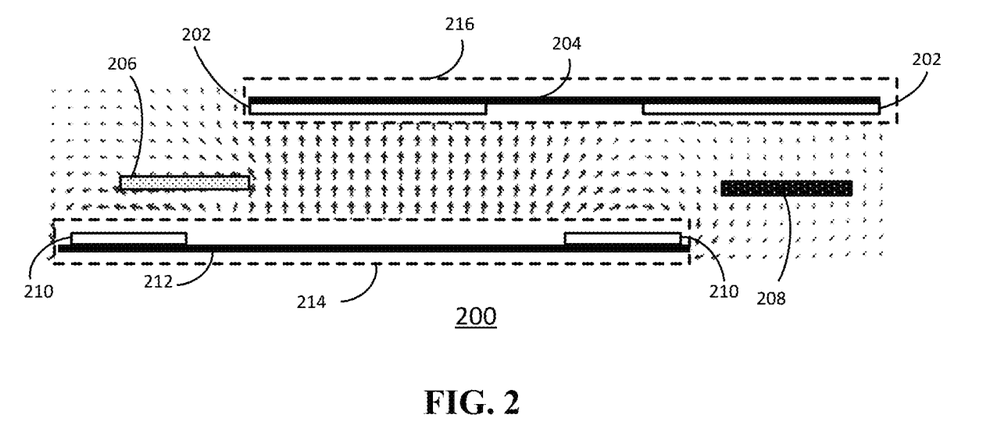
FIG. 2 illustrates foreign object detection using the wireless power system including a wireless power receiver according to an example embodiment.
Figure 3:
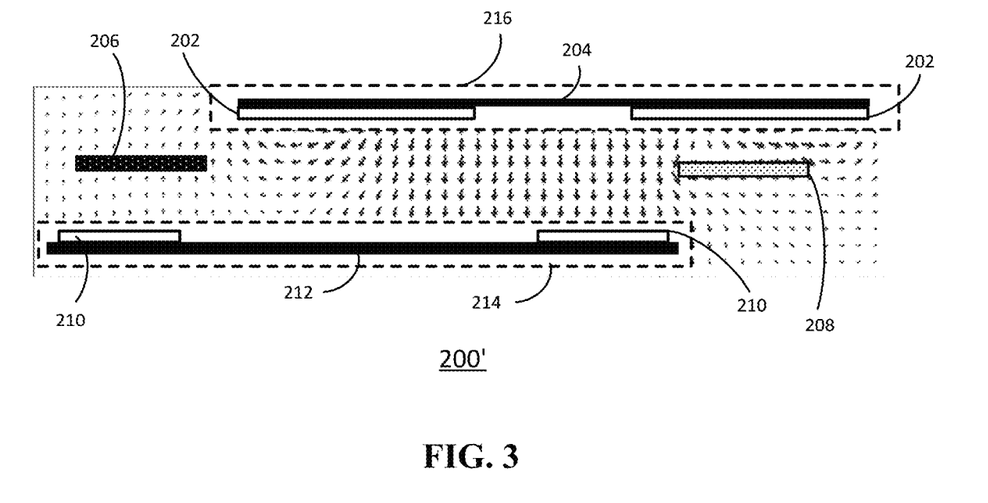
FIG. 3 illustrates foreign object detection using the wireless power system including a wireless power receiver according to an example embodiment

The benefit of applying the FOD on the receiver side according to the present disclosure may be further understood with reference to FIG. 2 and FIG. 3 which illustrates foreign object detection using the wireless power system including a wireless power receiver according to an example embodiment.

FIG. 2 shows a wireless power transfer system 200 configured to perform FOD on the PTU side and FIG. 3 shows the wireless transfer system 200' configured to perform FOD on the PRU side. RCA 216 has a receiver coil 202 and Ferrite 204. TCA 216 may form part of a PRU (not shown) which may be similar for example to the wireless power receiver 110 described in FIG. 1 or other example power receiver units described herein. A TCA 214 has one or more transmit coils 210 and a PTU ferrite 212. TCA 214 forms part of a PTU (not shown) which may be similar for example to the wireless power transmitter 140 described in FIG. 1 or other example power transmitter units described herein.

In FIG. 2 using a PTU-side slotted FOD method such as described in European Patent application 18166402.0, a blind spot can exist which corresponds to a location or locations where FO detection is not possible, but FO losses still occur. One foreign object 206 is well coupled to the transmitter coil 210 and therefore can be detected, but another foreign object 208 is not well coupled to the transmitter coil 210 so it will not be detected. Neither FO 206 or FO 208 will be detected by the receiver coil 202 during the measurement window because the receiver produces no magnetic field during this measurement time.

In FIG. 3 the PRU-side FOD method as described herein is used. In this case foreign object 208 is well coupled to the receiver coil 202 during measurement but foreign object 206 cannot be detected. Hence by combining a PRU-side FOD detection method described herein with existing FOD methods on the transmitter side, a blind spot-less high-precision detection system may be implemented.

Figure 4:
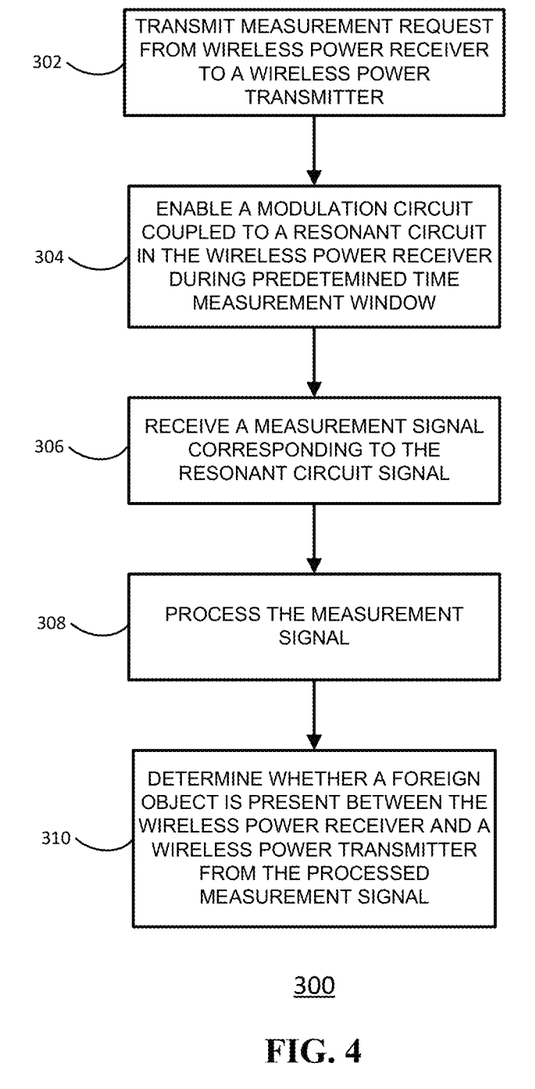
FIG. 4 shows a method of foreign object detection using a wireless power receiver according to an example embodiment.

FIG. 4 shows a method of foreign object detection 300 using a wireless power receiver according to an example embodiment. The wireless power receiver includes a resonant circuit including a receiver coil which in operation couples to a wireless power transmitter. The wireless power receiver includes a modulator circuit coupled to the resonant circuit. The modulation circuit may be used to modulate the resonant circuit signal to provide in-band communication back to the wireless power transmitter. In step 302 a measurement request may be transmitted from a wireless power receiver to the wireless power transmitter 302. This transmission request may be transmitted via an in-band communication link or an out-band communication link. The transmission request may not require any acknowledgement from the transmitter, but on receiving the request, the transmitter may disable power transmission for a predetermined time period. In step 304, a modulation circuit connected to the resonant circuit may be enabled in the wireless power receiver during a predetermined measurement time window following the transmission of the measurement request. This measurement window corresponds to a period when the wireless power receiver receives no power from the wireless power transmitter. The wireless power transmitter stops generating a magnetic field for example with reference to FIG. 1 by disconnecting all TCA coils using multiplexer drive signal 152. This ensures that only the receiver coil is generating a magnetic field, which may be analysed for foreign object presence using the measurement signal $U_m$.

In step 306 a measurement signal may be detected from the resonant circuit signal. In step 308, the measurement signal may be processed. This is typically done after the power transmitter is re-enabled but, in some cases, may be before if the receiver has sufficient power available. This processing may give an indication of the $Q_r$ factor of the wireless power receiver. In step 310 the method may determine whether a foreign object is present between the wireless power receiver and the wireless power transmitter from the processed measurement signal.

Figure 5:
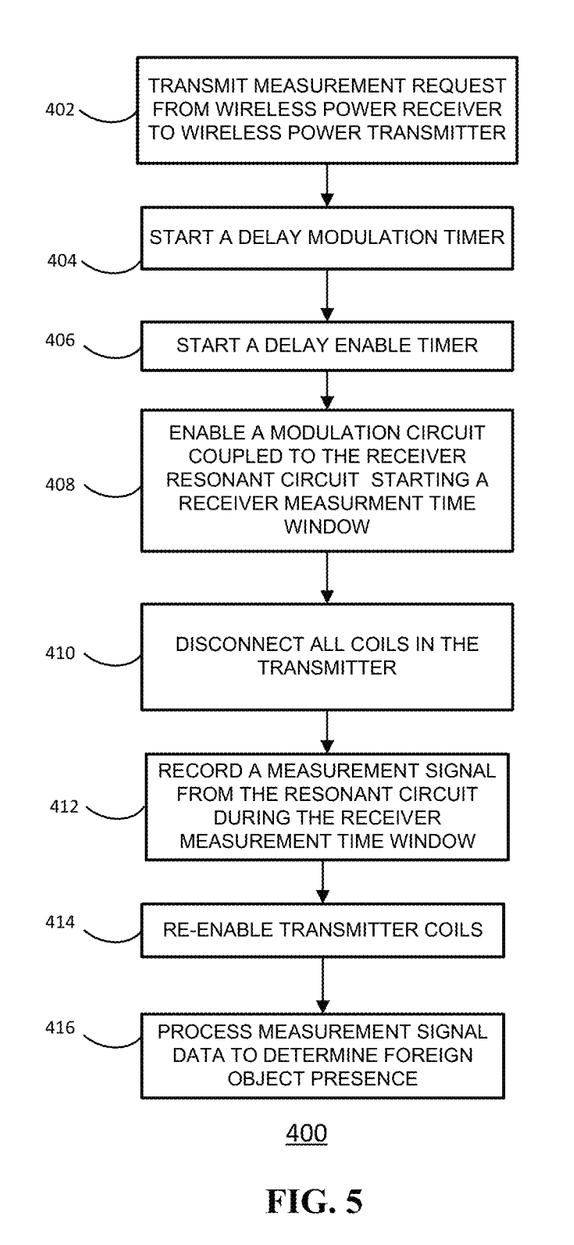
FIG. 5 shows a method of foreign object detection using a wireless power receiver according to an embodiment.

FIG. 5 shows a method of foreign object detection 400 using a wireless power receiver according to an example embodiment. The wireless power receiver includes a resonant circuit including a receiver coil which in operation couples to a wireless power transmitter. The wireless power receiver includes a modulator circuit coupled to the resonant circuit which may be used to modulate the resonant circuit signal to provide in-band communication back to the wireless power transmitter.

In step 402, a transmit measurement request is sent from the wireless power receiver to a wireless power transmitter. In step 404 a delay modulation timer may be started in the wireless power receiver. In step 406 a delay enable timer may be started in the wireless power transmitter. In step 408 after a predetermined time is reached by the delay modulation timer, a modulation circuit is enabled and coupled to a receiver resonant circuit which starts a measurement time window. In step 410 after the delay enable timer reaches a predetermined value the transmitter may disable the wireless power transmission for a predetermined time. In step 412 a measurement signal from the resonant circuit may be recorded during the receiver measurement time window. In step 414 the transmitter coils may be re-enabled. In step 416 the measurement signal data acquired during the measurement window may be processed to determine the presence of a foreign object.

Figure 6:
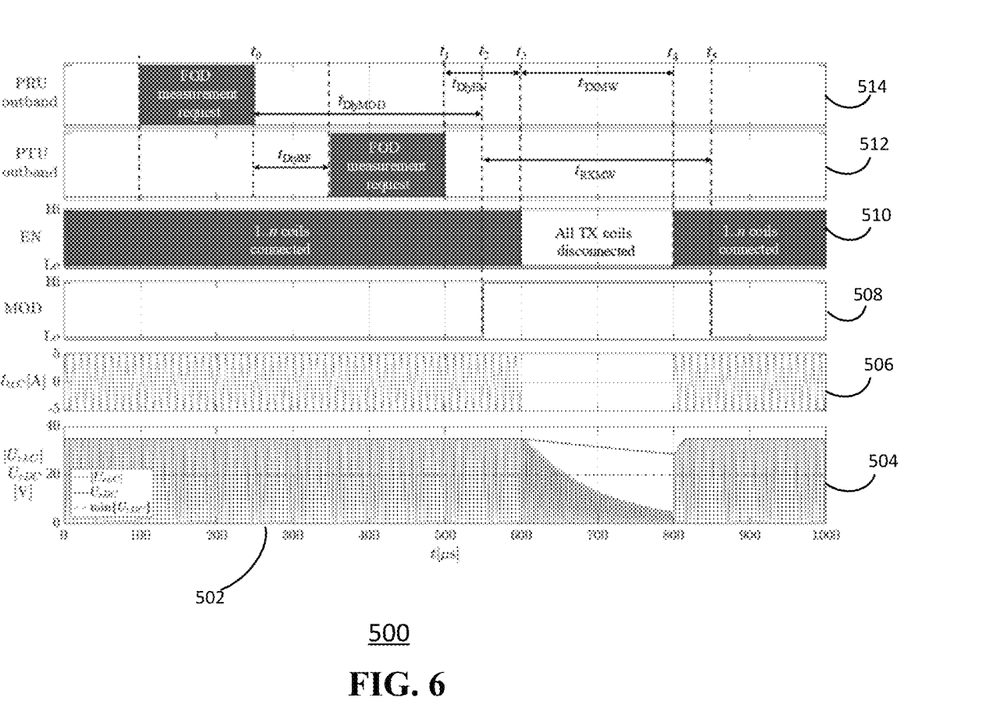
FIG. 6 shows a timing diagram for foreign object detection by a wireless power receiver according to an example embodiment.

FIG. 6 shows an example timing diagram 500 for foreign object detection using a wireless power receiver in a wireless power system. This may be implemented by one or more of the wireless power systems described herein. The horizontal axis 502 shows time from zero to 1000 microseconds. The variation of $U_{rLC}$ is shown in 504. The variation of $I_{tLC}$ is shown in 506. The modulation control signal is shown in 508. The transmitter coil enable is shown in 510. The PTU out-band timing is shown in 512 and the PRU out-band timing is shown in 514.

The PRU transmits FOD measurement request to PTU at time $t_0$ shown in PRU out-band timing 514. Once the transmission is completed, $t_{DlyMOD}$ timer is started. The PTU receives a FOD measurement request from the PRU. This is shown in PTU out-band timing 512 at the time $t_1$. The $t_{DlyEN}$ timer is started. The PRU enables modulation circuit at time t2 by setting MOD signal to high shown in modulation signal timing 508. This starts receiver measurement window $t_{RXMW}$ in which the measurement signal ($U_m$) must be continuously monitored.

At time $t_3=(t_1+t_{DlyEN})>(t_0+t_{DlyMOD})$ the measurement window $t_{TXMW}$ is started by PTU resetting all coil multiplexer enable $EN_1 \ldots EN_m$ signals 510 to low, which disconnects all coils $L_{t1} \ldots L_{tm}$. The resulting coil current $I_{tLC}$ shown in 506 falls to zero very quickly and all the energy of transmitter resonant circuit is stored in resonant capacitor $C_r$. The $t_{TXMW}$ timer is started. The PRU records $U_m$ signal for later postprocessing by either recording entire $t_{RXMW}$ or by detecting the start of $t_{TXMW}$ at time $t_3$. The DC-bus voltage $U_{rDC}$ starts to drop depending on power $P_{load}$ drawn by load. However, when capacitance $C_{rDC}$, which has a typical value in a 65 W system of 200 μF, is selected to be sufficiently large and measurement window $t_{TXMW}$ sufficiently short, for example 100 μs, the $U_{rDC}$ won't drop below minimal acceptable value $\min\{U_{rDC}\}$ before time $t_4$ and thus power delivery to load will remain uninterrupted.

Once the PTU $t_{TXMW}$ timer runs out, the active coils are re-enabled using appropriate EN signals and power transfer continuous as normal until a new FOD measurement request. The PRU either detects power transfer restoration by PTU in time $t_4$ or waits for $t_{RXMW}$ timer to run-out for disabling modulation circuit by clearing MOD signal. The PRU starts to postprocess recorded $U_m$ signal data and determines FO presence using methods described in the present disclosure.

Figure 7:
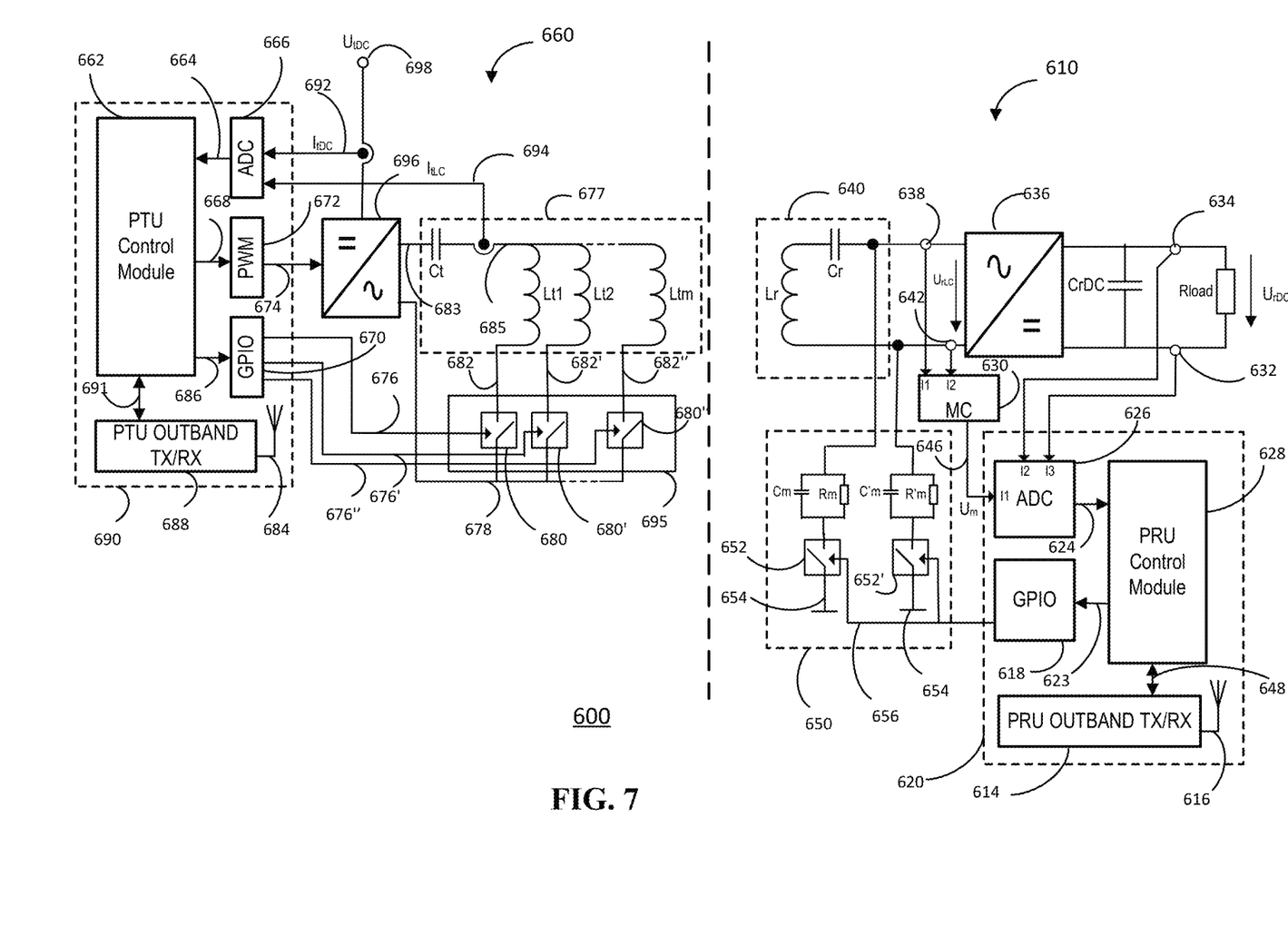
FIG. 7 illustrates a wireless power system including a wireless power transmitter and a wireless power receiver according to an example embodiment.

FIG. 7 shows a wireless power transfer system 600 including a wireless power transmitter unit 660 and wireless power receiver unit 610 according to an example embodiment.

The wireless power receiver unit 610 includes a power receiver unit controller 620, a modulator 650, a rectifier 636, a resonant circuit 640, a measurement circuit 630 and a smoothing capacitor $C_{rDC}$. The resonant circuit 640 includes a receiver coil array (RCA), which may be formed using a planar coil $L_r$ and a ferrite backplate (not shown) which may be similar to RCA 212 illustrated in FIG. 2. The resonant circuit 640 also has a receiver capacitor $C_r$ arranged in series with the planar coil Lr between a first resonant circuit node 638 and a second resonant circuit node 642. The first resonant circuit node 638 may be connected to a first terminal of the modulator circuit 650, a first input of the measurement circuit 630 and a first input of the rectifier 636. The second resonant circuit node 642 may be connected to a second terminal of the modulator circuit 650, a second input of the measurement circuit 630 and a second input of the rectifier 636.

The modulator circuit 650 may include a first series arrangement of a switch 652 and a parallel arrangement of a modulation capacitor $C_m$ and $R_m$ connected between a reference supply 654 which may be a ground and the first modulation output. The modulator circuit 650 may include a second series arrangement of a switch 652' and a parallel arrangement of a modulation capacitor $C_m'$ and $R_m'$ between a reference supply 654 which may be a ground and the second modulation output.

The power receiver unit controller 620 may include a power receiver unit (PRU) control module 628, an analog to digital converter (ADC) 626, a general-purpose input output (GPIO) 618, a PRU out-band transceiver 614 and antenna 616. The PRU controller 628 may be connected to the PRU out-band transceiver 614 via bidirectional connection 648. The PRU controller 628 may have a GPIO output 623 connected to the GPIO 618. The GPIO output 623 may be connected to a respective control input of modulator switches 652, 652'. The ADC 626 may have a first input 646 connected to an output of the measurement circuit 630. The ADC 626 may have a second input connected to a first output node 634. The ADC 626 may have a third input connected to a second output node 632. The ADC 626 may have an output 624 connected to the PRU control module.

The first output node 634 may be connected to a first output of the rectifier 636. A second output node 632 may be connected to a second output of the rectifier 636. The DC smoothing capacitor $C_{rDC}$ may be connected between the first output node 634 and the second output node 632.

The wireless power transmitter unit 660 includes a power transmit unit microcontroller 690, an inverter 696, a resonant circuit 677 and a coil multiplexer 695. The resonant circuit 677 includes a transmitter coil array (TCA) which may be formed from a series arrangement of a transmitter capacitor $C_t$ and a parallel arrangement of a number (m) of planar coils denoted $L_{t1}$, $L_{t2}$, $L_{tm}$. A first terminal of each planar coil $L_{t1}$, $L_{t2}$, $L_{tm}$ may be connected to a resonant circuit node 683. Each of the second terminals of $L_{t1}$, $L_{t2}$, $L_{tm}$ 682, 682', 682" may be connected to a respective first terminal of a respective switch 680, 680', and 680" include in the coil multiplexer 695. The TCA may also include a ferrite backplate (not shown). A first terminal of the transmitter capacitor $C_t$ may be connected to the resonant circuit node 683. A second terminal of the transmitter capacitor $C_t$ may be connected to a first inverter output 685. A second inverter output 678 may be connected to the second terminal in each of the switches 680, 680' and 680" in the coil multiplexer 695. A supply rail 698 may be connected to the inverter 696.

The PTU microcontroller 690 may include a PTU ADC 666, a PWM generator 672, a GPIO 670, a PTU out-band transceiver 688 connected to an antenna 684 and a PTU controller 662. The PTU out-band transceiver 688 may have a bidirectional connection 691 to the PTU controller 662.

The PTU controller 662 may have an input connection to the ADC output 664. The ADC 666 may have a first current sense input 692 coupled to the supply rail 698. The ADC 666 may have a second current sense input 694 coupled to the resonant circuit node 683.

The PTU controller 662 may have a PWM control output 668 connected to PWM generator 672. The PWM generator 672 may have a PWM output 674 connected to the input of inverter 696.

The PTU controller 662 may have a GPIO control output 686 connected to the PTU GPIO 670. The GPIO 670 may have outputs 676, 676' and 676" connected to respective control inputs of multiplexer switches 680, 680' and 680".

In normal operation, the PTU 660 is responsible for the generation and control of a high-frequency magnetic field which may for example include frequencies between 100 kHz and 150 kHz to perform wireless power transmission. The PTU microcontroller 690 may be an integrated device and uses the ADC 666 measurement of PTU electrical quantities such as for example input voltage $U_{tDC}$, input current $I_{tDC}$ and coil current $I_{tLC}$. The PTU 660 communication with PRU 610 may either use in-band communication as described for the wireless power system 100 or out-band communication using the PTU out-band transceiver 688. The PTU microcontroller 690 generates PWM driving signals for inverter 696, so wireless power transfer can be safely established and maintained.

All TCA coils $L_{t1}$, $L_{t5}$, up to $L_{tm}$ can be disconnected or connected using coil multiplexer 695, because only n coils (where $1 \leq n \leq m$) are typically selected in power transfer in multi-coil system. The coil multiplexer 695 is driven using enable signals from MCU GPIO output 676, 676', and 676" which connects one end of coils $L_{t1}$, $L_{t2}$, up to $L_{tm}$ to the second output of inverter 696 by controlling the respective multiplexer switches 680, 680' and 680".

The PRU 610 receives power from the PTU 660 and supplies power for a load $R_{load}$.

The PRU controller 620 may be an integrated device such as a microcontroller capable of ADC measurement of PRU electrical quantities for example DC-bus voltage $U_{rDC}$ and resonant circuit voltage $U_{rLC}$, and communication to PTU 660 either via in-band by driving modulation circuit 650 via GPIO 618 or via out-band wireless communication so power transfer can be safely initiated and maintained. The PRU control module 628 may be implemented in hardware or may be implemented as software running on a processor such as a CPU, microcontroller, digital signal processor.

The PRU resonant circuit 640 generates voltage $U_{rLC}$ when placed into active volume of powered TCA. The rectifier 636 converts high-frequency $U_{rLC}$ voltage to $U_{rDC}$ voltage on DC-bus consisting of first output node 635 and the second output node 632.

The $U_{rLC}$ Measurement Circuit (MC) 630 may be an analog circuit adapting $U_{rLC}$ signal to $U_m$ signal having a level and bandwidth measurable by PRU MCU ADC 626. In some examples the measurement circuit may not be required for example if the PRU ADC 626 can sample the resonant circuit signal $U_{rLC}$ directly. In this case the measurement signal $U_m$ is the same as $U_{rLC}$ during the foreign object detection measurement cycle To detect a foreign object, the PRU receiver 610 may run a measurement cycle. The PRU control module 628 may control the modulator 650 to transmit a measurement request in-band to the PTU 660. Alternatively, the PRU control module 628 may send the measurement request via the PRU out-band transceiver 614. The PTU controller 690 may detect the measurement request and disable all the TCA coils $L_{t1}$, $L_{t2}$, $L_{tm}$ for a short predetermined measurement time window by controlling the coil multiplexer 695. During this predetermined measurement time window, the PRU control module 628 may enable the modulator 650 connected to the receiver resonant circuit 640. The PRU controller 690 may receive a measurement signal $U_m$ which is converted from the resonant circuit signal $U_{rLC}$ by measurement circuit 630.

The rate of $U_m=f(U_{rLC})$ signal decay depends on quality of receiver-side resonant circuit. The receiver resonant circuit during measurement window can be described using the following equation applying Kirchhoff's Law $$0 = R_r I_{rLC} + R_{fo} I_{rLC} + p L_r I_{rLC} + \frac{1}{pC_r} I_{rLC} + \frac{2R_m}{1+pC_m R_m} = =$$
$$\left(R_{fo} + R_r + \frac{2R_m}{1+4\pi f_0^2 C_m^2 R_m^2}\right) I_{rLC} +$$
$$p L_r I_{rLC} + \frac{1}{p}\left(\frac{1}{C_R} + \frac{4\pi f_0^2 R_m^2 C_m}{1+4\pi f_0^2 C_m^2 R_m^2}\right) I_{rLC},$$

where $R_r$ is RCA coil resistance, $R_{fo}$ is resistance modelling real losses caused by FO, $f_0$ is receiver resonant frequency, p is a Laplace operator and $I_{rLC}$ is receiver resonant current. The receiver resonant circuit quality factor is then given as $$Q_r = \frac{\text{Energy stored}}{\text{Energy dissipated per cycle}} = \frac{2\pi f_0 L_r}{R_{fo} + R_r + \frac{2R_m}{1+4\pi f^2 C_m^2 R_m^2}},$$

where it can be clearly seen, that quality is inversely dependent on foreign object real losses $R_{fo}$.

The receiver quality factor $Q_r$ or another value which represents the receiver quality factor may be determined from the received measurement signal $U_m$. The PRU control module 628 may then determine a value for $R_{fo}$ postprocessed using an auto-regressive model and offline least square method. This value may be used to determine whether a foreign object is present.

The PRU control module 628 may determine a parameter relating to the Q factor of the resonant circuit using methods described previously. The measurement circuit 630 may modify the resonant circuit signal $U_{rLC}$ so that it can be sampled by the PRU ADC 626. The measurement circuit 630 may for example divide and level shift the $U_{rLC}$ signal. The measurement circuit 630 may for example detect peaks in the $U_{rLC}$ signal.

Figure 8:
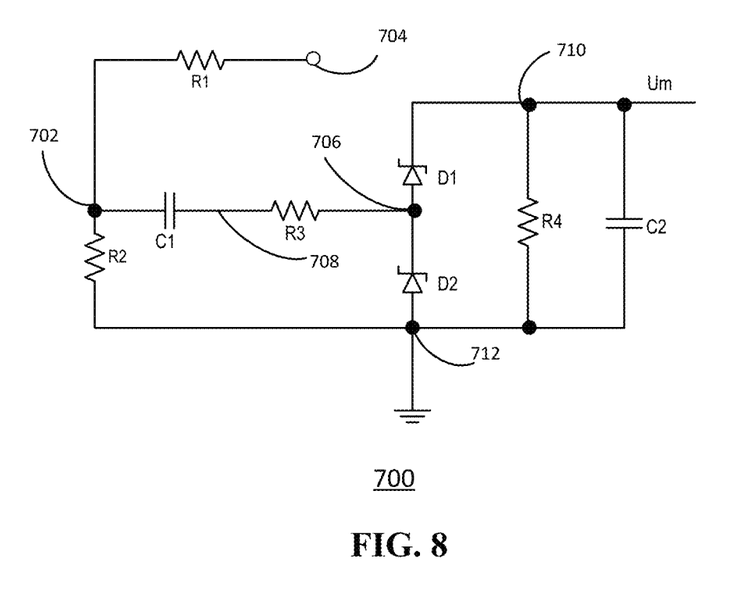
FIG. 8 shows a measurement circuit for use in example embodiments of a wireless power receiver.

FIG. 8 shows a further example of a measurement circuit 700 that may be used to implement the measurement circuit 630. A first node 704 may be connected to a first terminal of first resistance R1. A second node 702 may be connected to a second terminal of first resistance R1 a first terminal of a second resistance R2 and a first terminal of a first capacitor C1. A third node 708 may be connected to a second terminal of the first capacitor C1 and a first terminal of a third resistance R3. A fourth node 706 may be connected to a second terminal of third resistance R3, a first terminal of Schottky diode D1 and a second terminal of Schottky diode D2. A fifth node 710 which may be an output node may be connected to a second terminal of Schottky diode D1 a first terminal of resistance R4 and a first terminal of capacitance C2. A sixth node 712 which may be a ground may be connected to a second terminal of second capacitance C2, a second terminal of fourth resistor R4, a first terminal of Schottky diode D2 and a second terminal of second resistance R2.

In operation, when included for example in measurement circuit 630, the input node 704 may be connected to the first resonant circuit node 638 or the second resonant circuit node 642. The ground node 712 may be connected to the node 654. The circuit 700 may output a measurement signal $U_m$ on output node 710 by filtering and rectifying the $U_{rLC}$ signal received on the input node 704. Example values of the circuit components of measurement circuit 700 may be R1=47 KOhm, R16=5.1 KOhm, C1=3300 µF, R3=33 Ohm, R4=220 KOhm, C2=33 µF.

Figure 9:
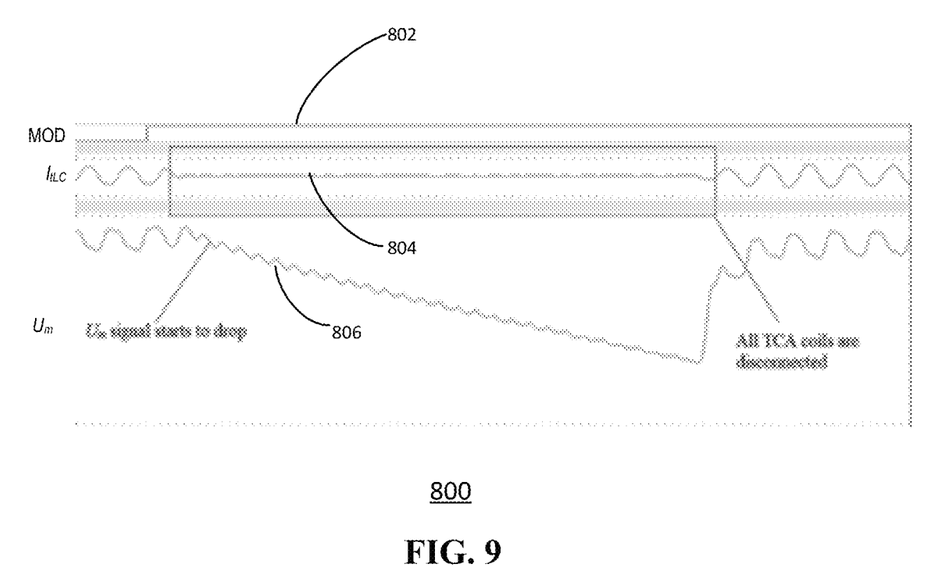
FIG. 9 shows an illustration of wireless power transmitter resonant circuit current and the measurement signal in an example embodiment of the wireless power receiver.

FIG. 9 shows a plot 800 of an example $U_m$ signal for a 65-Watt wireless power system resulting from the measurement circuit 700. Line 802 shows the modulation enable signal, line 804 shows the transmission coil current $I_{tLC}$. Line 806 shows the measurement signal $U_m$ 806. The measurement time window $t_{TXMW}$ is illustrated region 808 where the transmitter coils are disabled. The decay of the $U_m$ signal can be clearly seen and measured and also the start of $t_{TXMW}$ can be clearly detected as the $U_m$ signal starts to drop. With reference to FIG. 6, this may allow the delays $t_2$-$t_3$ and $t_4$-$t_5$ to be reduced or eliminated so that the receiver measurement window $t_{RXMW}$ is almost equal to the transmit measurement window.

Figure 10:
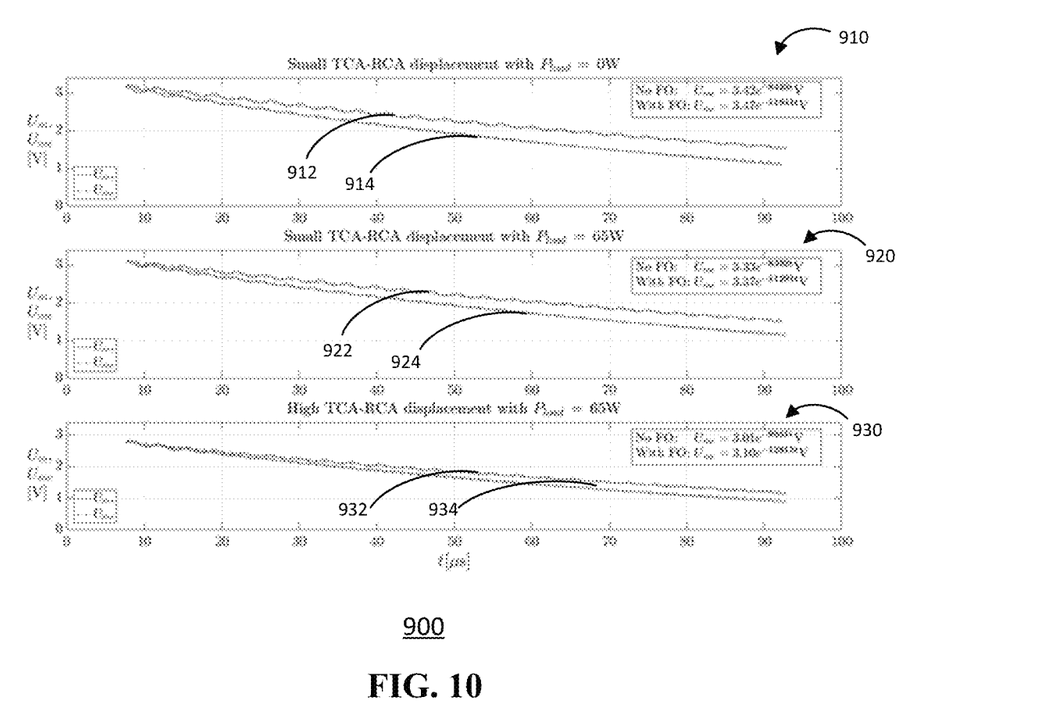
FIG. 10 shows an example of a measurement signal and exponential estimated or expected measurement signal with and without a foreign object present.

FIG. 10 shows the influence of FO presence, RCA-TCA displacement and drawn power $P_{load}$ on $U_m$ measurement 900. The solid lines show the measured signal $U_m$ and the dashed line the corresponding estimated signal $U_{me}$ fitted using least square method with exponential line. Each graph has time on the horizontal axis varying between zero and 100 microseconds and $U_m$, $U_{me}$ on the vertical axis varying between zero and three volts.

The measurement signals $U_m$ measured during the measurement window $t_{TXMW}$ may be post processed by fitting using least square method with exponential line $$U_{me} = Ae^{-Bt} \text{ where}$$

$$B = f(Q_r) = \frac{N \sum_{k=1}^{N} t_i \ln U_{mi} - \sum_{k=1}^{N} t_i \sum_{k=1}^{N} \ln U_{mi}}{N \sum_{k=1}^{N} t_i^2 - \left(\sum_{k=1}^{N} t_i\right)^2}$$

is the parameter, which can be used to determine FO presence. When the value of B raises above certain threshold for example B>10500 s$^{-1}$, this may indicate that a foreign object is present and the FOD protection can be triggered and power transfer terminated. Note that the increased value of B for higher displacements is caused by reduced inductance $L_r$ as the TCA ferrite is at a greater distance. In one or more embodiments the measurement signal may be processed to obtain a value for parameter B. The determined parameter value B may be used to determine the presence or absence of a foreign object.

In these examples, the measurements are for a round 70 mm planar receiver coil 202 with eleven turns. The transmitter coil does not matter as it does not affect the measurement since the transmitter is not generating a magnetic field. Only the vertical gap between receiver coil 202 and transmitter ferrite plate 212 which affects inductance $L_r$ is important. The small TCA-RCA displacement corresponds to an 8 mm gap. A large TCA-RCA displacement corresponds to a 14 mm gap Graph 910 shows the variation for small TCA-RCA displacement with receiver output power $P_{load}$=0 W. Solid and dashed lines 912 show the case for no foreign object detected and $U_{me}$=3.42e$^{-8423t}$. Solid and dashed lines 914 show the case for a foreign object detected and $U_{me}$=3.42e$^{-11941t}$.

Graph 920 shows the variation for small TCA-RCA displacement with receiver output power $P_{load}$=65 W. Solid and dashed lines 922 show the case for no foreign object detected and $U_{me}$=3.33e$^{-8332t}$. Solid and dashed lines 924 show the case for a foreign object detected and $U_{me}$=3.37e$^{-11291t}$.

Graph 930 shows the variation for large TCA-RCA displacement with receiver output power $P_{load}$=65 W. Solid and dashed lines 922 show the case for no foreign object detected and $U_{me}$=3.01e$^{-9951t}$. Solid and dashed lines 924 show the case for a foreign object detected and $U_{me}$=3.42e$^{-1213t}$.

Although examples described have measured the resonant circuit voltage to determine a measurement signal, it will be appreciated the resonant circuit current may also be a used. For example, $U_m$=f($U_{rLC}$) measurement can be replaced with $U_m$=f($I_{rLC}$) measurement using shunt resistor.

A system and method to detect the presence of conductive foreign objects for a multi-coil wireless power system is described. A wireless power receiver resonant circuit quality information may be obtained without any costly hardware or termination of power delivery to the power receiver load. The power receiver free-running coil current or voltage may be measured during a very short time window. In this time window, the measurement may be unaffected by transmitter and receiver load due to the transmitter coil disconnection and because the wireless power receiver has sufficient DC-bus capacitance.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A power receiver unit (PRU) controller for inclusion in a wireless power receiver, the PRU controller configured to:
generate a measurement request for transmitting to a wireless power transmitter;
generate an enable signal configured to enable a modulator in the wireless power receiver during a predetermined time window;
receive a measurement signal corresponding to a resonant circuit signal in a resonant circuit of the wireless power receiver;
process the measurement signal and determine whether a foreign object is present between the wireless power receiver and the wireless power transmitter from the processed measurement signal; and
wherein the wireless power receiver does not receive any power from the wireless power transmitter during at least part of the predetermined time window,
wherein the PRU controller comprises:
a first input configured to be connected to a first resonant circuit node;
a second input configured to be connected to a second resonant circuit node, wherein an inductor coil and a receiver capacitor of the resonant circuit are coupled in series between the first and second resonant circuit nodes; and
a modulator control output configured to be coupled to the modulator, wherein the modulator is connected to the first and second resonant circuit nodes and the modulator control output is configured to enable the modulator during the predetermined time window, in which enabling the modulator results in the resonant circuit signal, wherein the resonant circuit signal comprises one of a voltage or a current between the first and second resonant circuit nodes.

2. The PRU controller of claim 1 further comprising:
a third input configured to be coupled to a first wireless receiver output;
a fourth input configured to be coupled to a second wireless receiver output.

3. The PRU controller of claim 1 further configured to process the measurement signal to determine a quality factor or a parameter related to the quality factor of the resonant circuit from the measurement signal.

4. The PRU controller of claim 3 further configured to determine a quality factor or a parameter related to the quality factor of the resonant circuit from the rate of amplitude decrease of the measurement signal.

5. The PRU controller of claim 1 further comprising an analog to digital converter coupled to a control module.

6. The PRU controller of claim 1 further configured to generate a foreign object detect status for transmission to the wireless power transmitter.

7. A wireless power receiver comprising the PRU controller of claim 1 and further comprising the modulator coupled to the resonant circuit, a rectifier having an input coupled to the resonant circuit and an output configured to be coupled to a load wherein the PRU controller is coupled to the modulator and the resonant circuit and wherein the wireless power receiver is configured to:
transmit the measurement request to the wireless power transmitter;
couple the modulator to the resonant circuit during the predetermined time window in which the wireless power receiver does not receive any power from the wireless power transmitter;
process the measurement signal corresponding to the resonant circuit signal during the predetermined time window:
determine whether the foreign object is present between the wireless power receiver and the wireless power transmitter from the processed measurement signal.

8. The wireless power receiver of claim 7 further comprising a measurement circuit having an input coupled to the resonant circuit and an output coupled to the PRU controller.

9. The wireless power receiver of claim 8 wherein the measurement circuit comprises a series arrangement of a filter and a rectifier between the measurement circuit input and the measurement circuit output and wherein the PRU controller is further configured to detect the measurement signal by sampling the filtered and rectified resonant circuit modulation signal.

10. A power transmitter unit (PTU) controller for inclusion in a wireless power transmitter configured to transmit power to a wireless power receiver, the wireless power transmitter further comprising an inverter coupled to a resonant circuit, wherein the PTU controller comprises:
a pulse-width modulation output configured to be coupled to the inverter,
a control output configured to be coupled to the resonant circuit; and
a current sense input configured to be coupled to the resonant circuit and wherein the PTU controller is configured to:
receive a measurement request from the wireless power receiver;
disable the power transmission for a predetermined time window in response to receiving a measurement request from the wireless power receiver.

11. The PTU controller of claim 10 further configured to receive a foreign object detect status from the wireless power receiver and to disable the power transmission in response the foreign object detect status indicating that a foreign object has been detected.

12. A wireless power transmitter comprising the PTU controller of claim 10.

13. A method for detecting a foreign object by a wireless power receiver, the method comprising:
generating a measurement request for transmitting to the wireless power transmitter;
generating an enable signal configured to enable a modulator in the wireless power receiver for a predetermined time window, wherein the modulator is connected to a resonant circuit of the wireless power receiver and wherein enabling the modulator results in a resonant circuit signal in the resonant circuit;
receiving a measurement signal corresponding to the resonant circuit signal;
processing the measurement signal;
determining whether a foreign object is present between the wireless power receiver and the wireless power transmitter from the processed measurement signal;
wherein the wireless power receiver does not receive any power from the wireless power transmitter during at least part of the predetermined time window.

14. The method of claim 13 wherein processing the measurement signal comprises determining a quality factor or a parameter related to the quality factor of the resonant circuit from the measurement signal.

15. The method of claim 14 further comprising determining a quality factor or a parameter related to the quality factor of the resonant circuit from the rate of amplitude decrease of the measurement signal.

16. The method of claim 14 further comprising generating a foreign object detect status for transmission to the wireless power transmitter.

17. A wireless power transfer system comprising:
a wireless power receiver having a power receiver unit (PRU) controller, the PRU controller configured to:
generate a measurement request for transmitting to a wireless power transmitter,
generate an enable signal configured to enable a modulator in the wireless power receiver during a predetermined time window,
receive a measurement signal corresponding to a resonant circuit signal in a resonant circuit of the wireless power receiver, and
process the measurement signal and determine whether a foreign object is present between the wireless power receiver and the wireless power transmitter from the processed measurement signal,
wherein the wireless power receiver does not receive any power from the wireless power transmitter during at least part of the predetermined time window; and
a wireless power transmitter having a power transmitter unit (PTU) controller, the PTU controller configured to:
receive the measurement request from the wireless power receiver, and
disable the power transmission for a predetermined time window in response to receiving the measurement request from the wireless power receiver.

18. The wireless power transfer system of claim 17, wherein the wireless power receiver further comprises:
the modulator;
the resonant circuit coupled to the modulator; and
a rectifier having an input coupled to the resonant circuit and an output configured to be coupled to a load, wherein the PRU controller is coupled to the modulator and the resonant circuit.

19. The wireless power transfer system of claim 18, wherein the wireless power transmitter further comprises an inverter coupled to a second resonant circuit, wherein the PTU controller comprises:
a pulse-width modulation output configured to be coupled to the inverter,
a control output configured to be coupled to the second resonant circuit; and
a current sense input configured to be coupled to the second resonant circuit, wherein the PTU controller is further configured to receive a foreign object detect status from the wireless power receiver and to disable the power transmission in response the foreign object detect status indicating that a foreign object has been detected.

* * * * *